Patented July 13, 1954

2,683,718

UNITED STATES PATENT OFFICE 2,683,718

SPIRO-[XANTHENE-9,4'-IMIDAZOLIDINE]-2,5-DIONE

Clinton A. Dornfeld, Mundelein, and Werner J. Heidtke, Morton Grove, Ill., assignors to G. D. Searle & Co., Chicago, Ill., a corporation of Illinois No Drawing. Application January 11, 1952, Serial No. 266,086

4 Claims. (Cl. 260—309.5)

The present invention relates to new heterocyclic organic compounds and, more specifically, to spiro[xanthene-9,4'-imidazolidine]-2,5-dione, its salts and methods for the preparation thereof. The compounds which constitute this invention can be represented by the structural formula

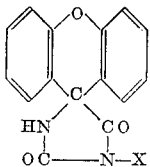

wherein X is hydrogen, an alkali metal radical or one equivalent of an alkaline earth metal radical.

It is an object of this invention to show the preparation of a novel heterocyclic compound. It is a further object to make available a new and valuable medicinal agent, having particular utility as an anticonvulsant drug. Spiro-[xanthene-9,4'-imidazolidine]-2,5-dione is prepared conveniently by heating xanthone with a water-soluble cyanide, typically an alkali metal cyanide, and ammonium carbonate in a solvent such as a lower aliphatic amide. After removal of the unreacted xanthone, the remaining salt of spiro-[xanthene-9,4'-imidazolidine]-2,5-dione is treated with an acid, such as hydrochloric acid, to liberate the free imidazolidine derivative. The latter can be reconverted into a salt by treatment with the appropriate metal hydroxide. The process of preparation will appear more clearly from the example below.

It will be understood that this procedure is given by way of illustration only and that numerous conventional modifications can be practiced without departing from the invention in spirit or in scope. Amounts of materials are given in parts by weight and temperatures in degrees centigrade (°C.).

3000 parts of acetamide are melted on the steam bath and placed in a bomb to which 392 parts of crystalline xanthone, 180 parts of potassium cyanide and 600 parts of ammonium carbonate are added. The bomb is closed as quickly as possible to avoid excessive loss of ammonia and carbon dioxide. After heating at 125–130° C. for 12 hours the mixture is permitted to cool, dissolved in 20,000 parts of water and acidified with dilute hydrochloric acid. The solid precipitate is collected on a filter and treated with 15,000 parts of 5% sodium hydroxide solution to form the sodium salt of spiro[xanthene-9,4'-imidazolidine]-2,5-dione. The unchanged xanthone is collected on a filter and the filtrate is acidified with dilute hydrochloric acid. The precipitated spiro-[xanthene-9,4'-imidazolidine]-2,5-dione is collected on a filter. It melts at about 330° C. with decomposition.

We claim:

1. The compounds of the structural formula

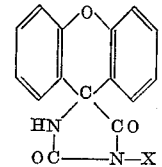

wherein X is a member of the class consisting of hydrogen and alkali metal radicals.

2. Spiro[xanthene-9,4'-imidazolidine]-2,5-dione.

3. An alkali metal salt of spiro[xanthene-9,4'-imidazolidine]-2,5-dione.

4. Sodium spiro[xanthene-9,4'-imidazolidine]-2,5-dione.

References Cited in the file of this patent

UNITED STATES PATENTS

| Number | Name | Date |
| --- | --- | --- |
| 2,409,754 | Henze | Oct. 22, 1946 |
| 2,461,038 | Cusic | Feb. 8, 1949 |

OTHER REFERENCES

Henze et al., J. Org. Chem. 15, 901–7 (1950).